US008918143B2

(12) United States Patent
Jacobs et al.

(10) Patent No.: US 8,918,143 B2
(45) Date of Patent: Dec. 23, 2014

(54) CHANGE OF THE SUBSCRIPTION IN AN IDENTIFICATION MODULE

(75) Inventors: Holger Jacobs, Wuppertal (DE); Jens Rüdinger, Düsseldorf (DE)

(73) Assignee: Vodafone Holding GmbH, Dusseldorf (DE)

(*) Notice: Subject to any disclaimer, the term of this patent is extended or adjusted under 35 U.S.C. 154(b) by 0 days.

(21) Appl. No.: 13/479,839

(22) Filed: May 24, 2012

(65) Prior Publication Data

US 2012/0329522 A1  Dec. 27, 2012

(30) Foreign Application Priority Data

May 24, 2011 (DE) .......................... 10 2011 076 415

(51) Int. Cl.
*H04B 1/38* (2006.01)
*H04M 1/68* (2006.01)
*H04W 8/18* (2009.01)

(52) U.S. Cl.
CPC ..................... *H04W 8/183* (2013.01)
USPC ........................................ 455/558; 455/411

(58) Field of Classification Search
CPC .................. H04W 8/183; H04W 8/20

USPC ................................................. 455/558, 411
See application file for complete search history.

(56) References Cited

U.S. PATENT DOCUMENTS 7,613,480 B2 * 11/2009 Brown .......................... 455/558

FOREIGN PATENT DOCUMENTS

EP          2182750 A1 *    5/2010

* cited by examiner

*Primary Examiner* — Omoniyi Obayanju
(74) *Attorney, Agent, or Firm* — International IP Law Group, PLLC

(57) ABSTRACT

The subject innovation relates to a method for changing from the active subscription data of a first service provider to the active subscription data of a second service provider in an identification module for use in a mobile radio device that can be connected to a mobile radio network. The change is initiated in the identification module in response to a receipt of a first message from the second service provider, and, after the initiation of the change, the identification module controls the activation of the subscription data of the second service provider based on a receipt of a message from the first service provider confirming the change. The subject innovation also relates to an identification module that is suitable for carrying out the method.

12 Claims, 2 Drawing Sheets

CHANGE OF THE SUBSCRIPTION IN AN IDENTIFICATION MODULE

CROSS REFERENCE TO RELATED APPLICATION

This application claims priority to German (DE) Patent Application No. 102011076415.1, filed on May 24, 2011, the contents of which are incorporated by reference as if set forth in their entirety herein.

BACKGROUND

In order to access mobile radio networks and the mobile radio services provided therein, subscribers are registered with a mobile radio operator in a home. After the registration, the subscriber can log on to the home network and can make use of the mobile radio services of the home network at the mobile radio rates agreed upon with the service provider. Access to mobile radio networks of other service providers is likewise possible making use of the registration in the home network. Such access, which is also referred to as roaming, however, is usually associated with higher costs for the use of services and a limited selection of mobile radio services. Therefore, as a rule, mobile radio subscribers carefully customize their home network to their usage pattern of mobile radio services and select, for example, a home network that can be accessed in the geographic region in which the subscriber uses mobile radio services without roaming and/or in which the mobile radio services they use most often are offered at favorable rates.

As a result of the registration in a home network, the subscriber receives subscription data from the mobile radio service provider, and this data is used for the identification and for the authentication when the subscriber logs on with a mobile radio device to the home network or to another mobile radio network. As a rule, the subscription data comprises at least one identifier associated with the subscriber, such as, an International Mobile Subscriber Identity (IMSI) and a secret key that is used in the authentication procedure. The subscription data is stored in a secured chip that is connected to the mobile radio device of the subscriber and that is also referred to here as the identification module. The identification module can be contained in a card that is placed into the mobile radio device and that can be configured, for instance, as a Subscriber Identity Module (SIM) card. Such a chip card is generally used in mobile phones, smartphones, notebook computers or similar mobile radio devices. Likewise, the identification module can be integrated into the mobile radio device as is sometimes done with simpler telematic devices, such as machine-to-machine (M2M) or telematic devices.

Linking an identification module to a home network in which subscription data is installed is carried out with conventional identification modules within the scope of the configuration of the SIM card by the provider of the home network or by the supplier of the identification module before the identification module is issued to the subscriber. After the identification module has been issued, it can then no longer be linked to another home network. If the subscriber would like to change the home network, such a conventional identification module is typically replaced. However, such a change is at the very least associated with a great deal of logistical effort that arises when a new identification module is to be provided. In the case of an identification module that is integrated into a mobile radio device, the effort is even greater since the identification module cannot simply be replaced by another one, so that a replacement of the entire mobile radio device is often even more economical when the home network is changed.

In order to simplify the changing of the home network or the mobile radio service provider, GB 2 378 064 A proposes a method in which, after an identification module has been issued from a remote location by an over the air (OTA) mechanism, which allows a secure message transmission, the identification module can be linked to a new home network via a mobile radio network—i.e. via the air interface. In this process, some of the subscription data for different service providers is already stored in the identification module in advance, and a central management center can activate the subscription data by an OTA message sent to the identification module, if the identification module is to be registered in the home network of a given service provider. Thus, the mobile radio service provider may be changed without issuing a new identification module.

In the known method, however, the problem arises that for a secure change of the active subscription data, a reliable management center is set up which can control the change and also authorize it. Otherwise, an identification module could be made to carry out an unauthorized change of the active subscription data. The operation of a reliable management center, however, is associated with considerable organizational and technical effort.

SUMMARY

The subject innovation relates to changing active subscription data in an identification module for use in a mobile radio network. In particular, the subject innovation relates to a method for changing active subscription data in an identification module for use in a mobile radio device, and it also relates to an identification module that can be used to carry out the method.

According to a first aspect of the subject innovation, a method is proposed for changing from the active subscription data of a first service provider to the active subscription data of a second service provider in an identification module for use in a mobile radio device. The mobile radio device can be connected to a mobile radio network. In the method, the change is initiated in the identification module on the basis of the receipt of a first message from the second service provider, and, after the initiation of the change, the identification module controls the activation of the subscription data of the second service provider based on the receipt of a message from the first service provider confirming the change.

According to another aspect, the subject innovation proposes an identification module for use in a mobile radio device that can be connected to a mobile radio network. The identification module is configured to change from the active subscription data of a first service provider to the active subscription data of a second service provider, and the change can be carried out in the identification module in response to a receipt of a first message from the second service provider, and the identification module is configured to control the activation of the subscription data of the second service provider after initiating the change based on a message from the first service provider confirming the change.

Consequently, the subject innovation allows a simpler change of the active subscription data in an identification module, which makes it possible to dispense with a central management unit for controlling the change. Since the activation of the subscription data of the second service provider is controlled based on the receipt of a message from the first service provider confirming the change, it is prevented that the change is made without the permission of the first service provider.

In one embodiment of the method and of the identification module, it is provided that the message confirming the change is sent when the first service provider has received a report providing information about the change. The report can be a separate report that provides information about the change. In this manner, the first service provider is alerted to the change if the change is otherwise carried out so as to be transparent for the first service provider. An associated embodiment of the method and of the identification module provides that the report that informs the first service provider about the change is sent to the first service provider by the identification module. As an alternative, however, the message can also be sent to the first service provider by the second service provider.

In one embodiment of the method and of the identification module, the identification module blocks the activation of the subscription data of the second service provider until the message confirming the change has been received in the identification module. Consequently, in this embodiment, the change cannot be carried out before the confirmation message from the first service provider has been received. The blocking of the change may be performed by a secure application executed in the identification module for controlling the activation of the subscription data.

Another embodiment of the method and of the identification module is characterized in that, after the activation of new subscription data of the second service provider, the identification module automatically returns to the activation of the subscription data of the first service provider if the message from the first service provider confirming the change is not received in the identification module. In this embodiment, the change of the active subscription data is initially carried out without a confirmation from the first service provider. However, a return to the activation of the subscription data of the first service provider is provided if the confirmation message is not received from the first service provider, in order to prevent changes of the active subscription data which are not authorized by the first service provider.

It can also be provided that the confirmation of the first or old service provider is received before the activation of the subscription data of the second service provider. In this case, the activation of the subscription data of the new service provider is not carried out if a confirmation message has not been previously received from the old service provider. In this embodiment, a change of the subscription data is avoided in that the change is not authorized by the old service provider. On the other hand, the embodiment in which the confirmation message is received after the change of the subscription data has the advantage that the old service provider merely confirms the change if the log-on using the subscription data of the new service provider was successful.

The return to the activation of the subscription data of the first service provider can be carried out in that this subscription data is activated and the subscription data of the second service provider is deactivated.

In this context, active subscription data refers to subscription data that is stored in the identification module and that is provided for use, whereas non-active subscription data is not provided for use. After the subscription data of the second service provider has been deactivated, it can remain stored in the identification module, although in an alternative embodiment, it can also be deleted.

In one embodiment of the method and of the identification module, the return to the activation of the subscription data of the first service provider is carried out after the mobile radio device has logged on to a mobile radio network by using the subscription data of the second service provider. In this case, the message from the first service provider confirming the change of the active subscription data is sent via the mobile radio network in which the mobile radio device is logged on using the subscription data of the second service provider. Furthermore, one embodiment of the method and of the identification module comprises that the report that informs the first service provider about the change is sent by the identification module to the first service provider after the log-on to the mobile radio network is carried out using the subscription data of the second service provider. Advantageously, in this embodiment, the first service provider is informed about the change of the active subscription data after the mobile radio device was able to successfully log on to a mobile radio network using the subscription data of the second service provider. In this case, the report is transmitted to the first service provider via this mobile radio network.

Moreover, in another refinement of the method and of the identification module, the return to the use of the subscription data of the first service provider is carried out when the message from the first service provider confirming the change is not received within a certain period of time and/or until a predefined event is detected. The countdown of the period of time is started in response to the log-on to the mobile radio network or in response to the transmission of the report informing the first service provider about the change. An event can be any type of event that can be detected in the identification module or in the mobile radio device. Examples of such events are the change to another cell of the mobile radio network and an input by the user.

In one embodiment of the method and of the identification module, the subscription data of the second service provider is transmitted to the identification module within a message of the second service provider and, after the message is received, the subscription data is installed in the identification module. In this manner, an installation of the subscription data of the second service provider is possible via remote access to the identification module. In this embodiment, the identification module may be produced or initially configured without installing the subscription data. The message that can contain the subscription data can be the first message from the second service provider for initiating the change of the active subscription data.

Moreover, one embodiment of the method and of the identification module provides that messages of a service provider have an authentication feature of the service provider, which is checked in the identification module. In particular, the message from the first service provider confirming the change can be provided with an authentication key of the first service provider. In this case, like when the confirmation message has not been received, the activation of the subscription data of the second service provider is blocked, or it is returned to the activation of the subscription data of the first service provider, if the confirmation message cannot be successfully authenticated. Moreover, the first message of the second service provider for initiating the change of the active subscription data and/or the message containing the subscription data of the second service provider are provided with an authentication feature of the second service provider. Here, the change may not be initiated and/or the subscription data not installed if the messages cannot be successfully authenticated in the identification module.

The authentication features of the above-mentioned messages of the old and new service providers can be an encryption of at least part of the messages. Here, useful data of the message such as, for example, reports, commands or subscription data contained in the message, can be encrypted with a cryptographic key of the service provider in question, or the message can contain a digital signature of the service provider which is normally likewise encrypted with a key of the service provider.

In order to check the authentication feature, a cryptographic key of the service provider can be used in the identification module. In this context, one embodiment of the method and of the identification module provides that the identification module uses a key in order to check the authentication feature associated with a service provider, and this key is selected from a plurality of secret keys that are stored in the identification module and that are associated with various service providers. In this manner, the identification module is capable of checking the authentication features of several service providers on the basis of cryptographic keys that are independent of each other. Consequently, different service providers can each use their own authentication features, as a result of which the security is increased.

The above-mentioned as well as other advantages and features of the subject innovation are also explained on the basis of the embodiments that are described below with reference to the figures.

BRIEF DESCRIPTION OF THE DRAWINGS

FIG. 1 schematically shows a mobile radio device 101 with which mobile radio networks 102$i$ (i=A, B) can be accessed wirelessly. By way of an example, FIG. 1 shows two mobile radio networks 102A, 102B that are operated by different mobile radio service providers A and B.

DETAILED DESCRIPTION OF SPECIFIC EMBODIMENTS

Figure 1:
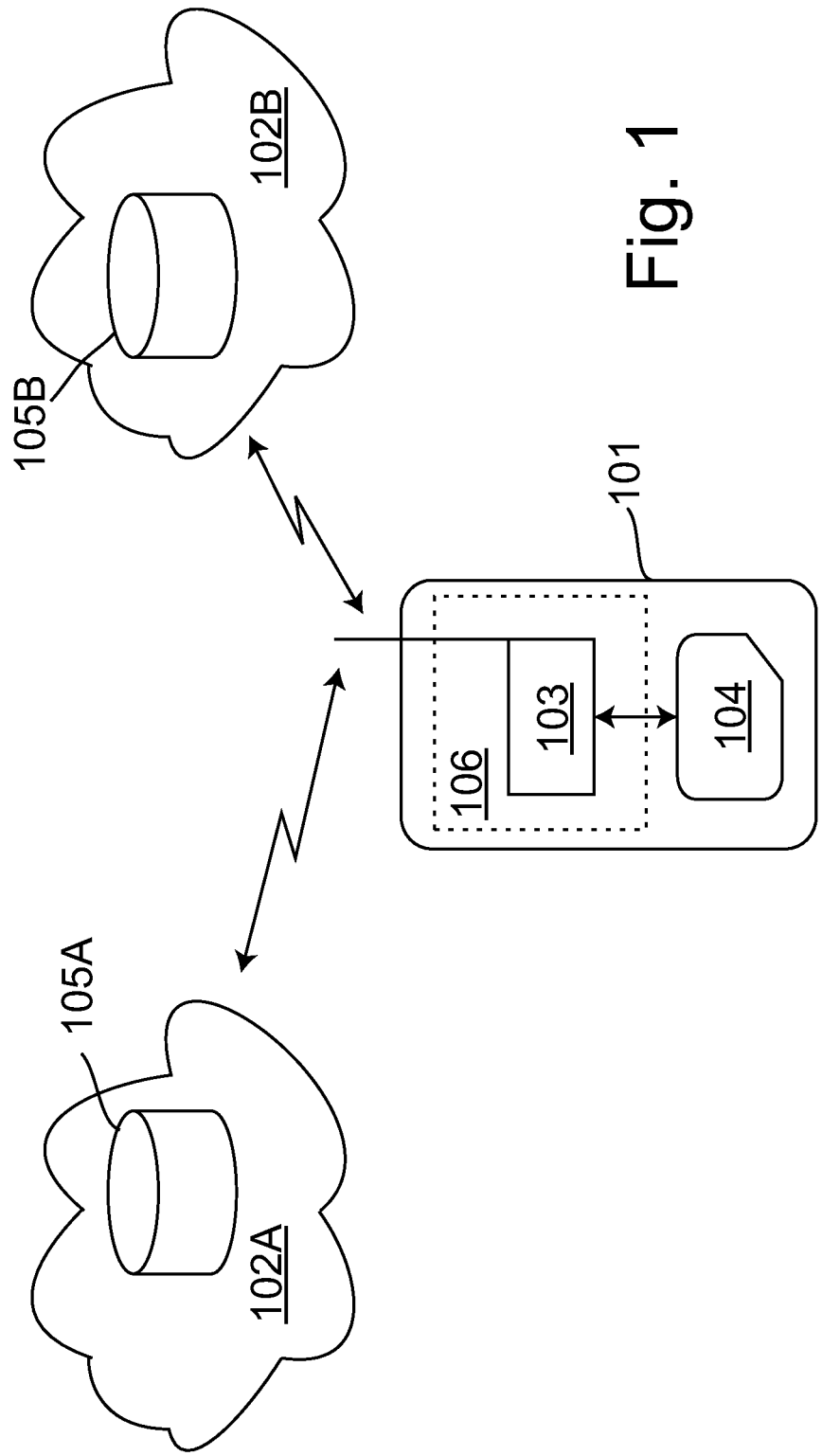
FIG. 1 a schematic depiction of a mobile radio device with an identification module that can communicate with two different mobile radio service providers, and FIG. 2 a state diagram with different states that an identification module can assume in conjunction with a change of the service provider.

The mobile radio device 101 is an electronic communication device that can be configured as a mobile or a stationary device. In one embodiment, the mobile radio device is used by a user to exchange or retrieve information via a mobile radio network 102$i$, and for this purpose, it provides suitable user interfaces such as input and output. In this embodiment, the mobile radio device 101 can be, for example, a mobile phone, a smartphone, a tablet or notebook computer or the like. Likewise, the mobile radio device 101 can be an M2M or telematic device that is configured for the automatic exchange of information with similar devices and/or centers. Such an M2M device can be used, for example, for the remote monitoring, remote control and remote maintenance of machines, installations and other systems, and for this purpose, it can have monitoring sensors and control actuators that are adapted to the application purpose and that can be read out and controlled, for example, via mobile radio.

The mobile radio device 101 contains an identification module 104 and a terminal 106. The mobile radio device 101 accesses a mobile radio network 102$i$ via a radio access network to which a radio module 103 that is contained in the terminal can connect. For this purpose, the radio module 103 has the requisite radio technology, for example, an antenna, with associated peripheral components, and it has a control unit to control the radio module and to carry out the data processing for the data exchange. In addition to the radio module 103, the terminal 106 has additional components (not shown in the figure) such as, for example, one or more processors for controlling the terminal 106 and for executing additional programs, a memory unit for storing data and programs, input and output devices, and additional hardware and software components for executing the functions provided by the terminal 106.

The radio module 103 can be connected to the identification module 104 which provides data and processes for the mobile radio device 101 to access a mobile radio network 102$i$. In one embodiment, the identification module 104 is a chip contained in a chip card that can be removably inserted into a card reader of the terminal. In this embodiment, the identification module 104 can be, for example, a SIM or USIM card that is used to access a GSM (Global System for Mobile Communications) network, a UMTS (Universal Mobile Telecommunications System) network or an LTE (Long Term Evolution) network. Likewise, the identification module 104 can be a chip that is integrated into the mobile radio device 101. In particular, the chip can also be configured as a SIM or USIM chip, that is to say, as a chip for subscriber identification and authentication in mobile radio networks of the above-mentioned type. In contrast to a chip card, such an integrated chip does not use a card reader in order to connect to the terminal 106 and can thus be used in simply structured M2M devices. In another embodiment, the identification module 104 is not integrated into a separate chip, but rather is configured as a secured software module that, together with additional software, is executed on a processor of the terminal 106.

The processes for access to a mobile radio network 102$i$, which can be implemented in the identification module 104, include an encryption algorithm that is used for the authentication of the identification module 104 in a mobile radio network 102$i$. By using this algorithm and a secret key, in one embodiment, encrypted information is generated that is sent to the mobile radio network 102$i$ for authentication purposes and that is checked in an authentication center of the mobile radio network 102$i$. Moreover, during the execution of the algorithm, additional information of the service provider that is stored in the identification module 104 may be taken into account, such as, for instance, a service provider-specific key that is valid for most identification modules 104 of a service provider. The information used for access to a mobile radio network 101 and stored in the identification module 104 comprises subscription data Si that is used to identify and authenticate the identification module 104 during the log-on to a mobile radio network 102$i$. The subscription data can contain the above-mentioned secret key and possibly, additional information for computing the authentication information, as well as an identifier that is unambiguously associated with the identification module 104. The identifier, which can be, for example, an IMSI, is used to identify the identification module 104.

In addition to the subscription data, additional service provider-specific parameters Xi can be stored in the identification module 104, and these parameters are used for access to a mobile radio network 102$i$, but they are not used to identify and/or authenticate the subscriber. Examples of such parameters are specifications for mobile radio networks 102$i$ that are used for the network selection when the mobile radio device 101 logs on to a mobile radio network 102$i$, as well as parameters for access to one or more mobile radio services such as, for example, access points for making use of services within the mobile radio network 102$i$. Moreover, data of the user such as, for instance, address book data and/or received as well as sent messages can be stored in the identification module 104, which the user can then access during the operation of the mobile radio device 101*i*. The data stored in the identification module 104 is stored in a file system of the system that contains files specified for the storage of the subscription data Si and of the service provider-specific parameters Xi, that is to say, files with predefined designations that contain the values of the parameters Xi and the data elements of the subscription data Si. Aside from the above-mentioned data, additional information can be stored in the identification module 104 that is changed or retained when the subscription data Si is changed. In case of a change, this data can either be changed together with the subscription data Si or together with the service provider-specific parameters Xi (if these are adapted at a different point in time than the subscription data is).

On the basis of the subscription data Si, the identification module 104 is linked to a mobile radio network 102*i*, which is referred to as the home network. Within the home network 102*i*, the identification module 104 is registered in a subscriber database 105*i* under the identifier contained in the subscription data Si. The subscriber database 105*i*, which can be configured, for instance, as an HLR (Home Location Register), contains—along with the identifier of the identification module 104—a key corresponding to the key that is contained in the subscription data and that is used in the authentication of the identification module 104. Here, during the authentication using the key, the authentication center of the home network 102*i* that is connected to the subscriber database 105*i* can encrypt the same information as in the mobile radio device 101, and it can compare this information to the encrypted information received from the mobile radio device 101, in order to successfully authenticate the identification module 104 if the two items of encrypted information match. Aside from the data that corresponds to the subscription data Si, additional information associated with the identification module 104 can be contained in the subscriber database 105*i* such as, for example, the authorizations associated with the identification module 104 and used to access various mobile radio services.

The identification module 104 schematically shown in FIG. 1 is characterized in that a change of the active subscription data Si can be undertaken so that the home network 102*i* associated with the identification module 104 can be replaced by another one. In this manner, the operator of the mobile radio device 101 can change the home network 102*i* or the mobile radio service provider without having to replace the identification module 104. The change of the home network 102*i* or of the mobile radio service provider can be controlled during the operation of the identification module 104 by a mobile radio network 102*i* via the air interface. Thus, the service provider is changed without transporting the identification module 104 to a certain place such as, for instance, a point of sale or service center of a service provider in order to be able to make the change. Rather, the service provider change can be carried out anywhere where there is mobile radio reception for the mobile radio device 101.

Several ways to make the change are described below by way of an example. Here, it is assumed that the change from a service provider A that operates the mobile radio network 102A is being made to a service provider that operates the mobile radio network 102B.

In order to be able to make the change from service provider A to service provider B, the identification module 104 is configured to at least temporarily store subscription data SA of service provider A as well as subscription data SB of service provider B. However, one of the subscription data records Si is active at a time, that is to say, can be used to log on to a mobile radio network 102*i* for identification and authentication purposes. The other subscription data record Si is inactive and not used. The activation of the subscription data records Si is controlled by an application that is executed within the identification module 104, but that receive and perform external control commands. The possibility to activate and deactivate subscription data Si can be implemented in various ways. For example, the subscription data Si that is active in each case, can be stored in the files provided for this purpose, whereas the deactivated subscription data Si can be stored somewhere else in the identification module 104, or else the files contain a reference to the storage locations of the appertaining data elements of the subscription data Si, whereby the references can be changed and each refer to the active subscription data Si.

The encryption algorithm used for the authentication for both service providers A and B can be the same. For example, the Milenage algorithm that is generally known and that is standardized by the 3GPP can be used. As an alternative, it can be provided that service provider-specific algorithms are used. In this case, when the service provider is changed, the algorithm is also changed. This change can be carried out in a manner that is analogous to the change of the active subscription data Si and is thus not described separately. As is also described below for the subscription data Si, the various algorithms can be implemented in the identification module 104 in advance, for example, at the time of production or at the time of the initial configuration, or else the new service provider B installs its algorithm via the air interface at the time of the service provider change.

The service provider-specific parameters Xi are likewise replaced at the time of a service provider change, so that service providers A and B can specify the configuration of the identification module 104 that they each use. For the service provider-specific parameters Xi, it can likewise be provided that parameters of both service providers A and B are available in the identification module 104 at the same time. In this case, the application of the identification module 104 likewise is configured such that the parameters Xi of one service provider are active and used in each case, and that the parameters Xi of the other service provider are deactivated and not used. In order for the parameters XA of service provider A to be replaced by the parameters XB of service provider B, in this embodiment, the application deactivates the parameters XA of service provider A and activates the parameters XB. Another embodiment does not involve the simultaneous provision of several parameter sets Xi. In this embodiment, the parameters XA of service provider A are replaced by the parameters XB of service provider B in that the parameters XA are overwritten by the parameters XB, a process in which the parameters XA are deleted.

The subscription data records Si and the service provider-specific parameters Xi can be manipulated by service providers A and B. In this manner, the service providers can install subscription data in the identification module 104 and they can change or delete installed subscription data Si, and they can change the configuration of the identification module 104 on the basis of changes in the service provider-specific parameters Xi. In order to access the data of the identification module 104 as well as in order to transmit control commands and other reports, a secure mechanism can be used in order to prevent unauthorized access to the identification module 104. In one embodiment, for access to the identification module 104, the service providers send cryptographically secured messages that are at least partially encrypted and that are then decrypted in the identification module 104. The keys used for the encryption and decryption can form symmetrical or asymmetrical key pairs. In addition to the encryption, it can also be provided that the messages contain additional authentication features, for example, a digital signature of the sender, and these authentication features are checked in the identification module 104 in order to authenticate the message. For the checking procedure, the digital signature, which is encrypted with a key of the service provider, is decrypted with an associated key that is stored in the identification module 104. Moreover, the secured messages have a format so that, when they are received in the mobile radio device 101, they are forwarded to the identification module 104 automatically and transparently, that is to say, invisibly to the user. Below, the secured messages are also referred to as over the air (OTA) messages and the keys employed are referred to as OTA keys. The designation OTA is derived from the standardized OTA mechanism for the remote maintenance of chip cards, but here it is not restricted to this specific mechanism.

The OTA keys available in the identification module 104 can be installed in the identification module 104, for example, at the time of production or at the time of the initial configuration. The OTA keys are unambiguously associated with the identification module 104 in order to prevent the OTA messages that are addressed to a specific identification module 104 from being readable by other identification modules 104. Furthermore, the various service providers employ their own OTA keys. In this context, it can be provided that the access by operators A and B to the subscription data Si is limited to their own subscription data. In other words, service providers can install, change and delete their own subscription data Si, but they are not authorized to change or delete subscription data of another service provider that is present in the identification module 104. The access authorization is checked in the identification module 104 when the subscription data Si is accessed. Similar access authorizations can also be provided for access to the parameters Xi if several sets of parameters of different service providers are present in the identification module 104 at the same time.

The user data stored in the identification module 104 is not changed when a change is made from service provider A to service provider B. Thus, for example, even after changing the service provider, users of the mobile radio device 101 still have unchanged access to their data that is stored in the identification module 104 and can continue to use it after the service provider has been changed, without additional work.

Figure 2:
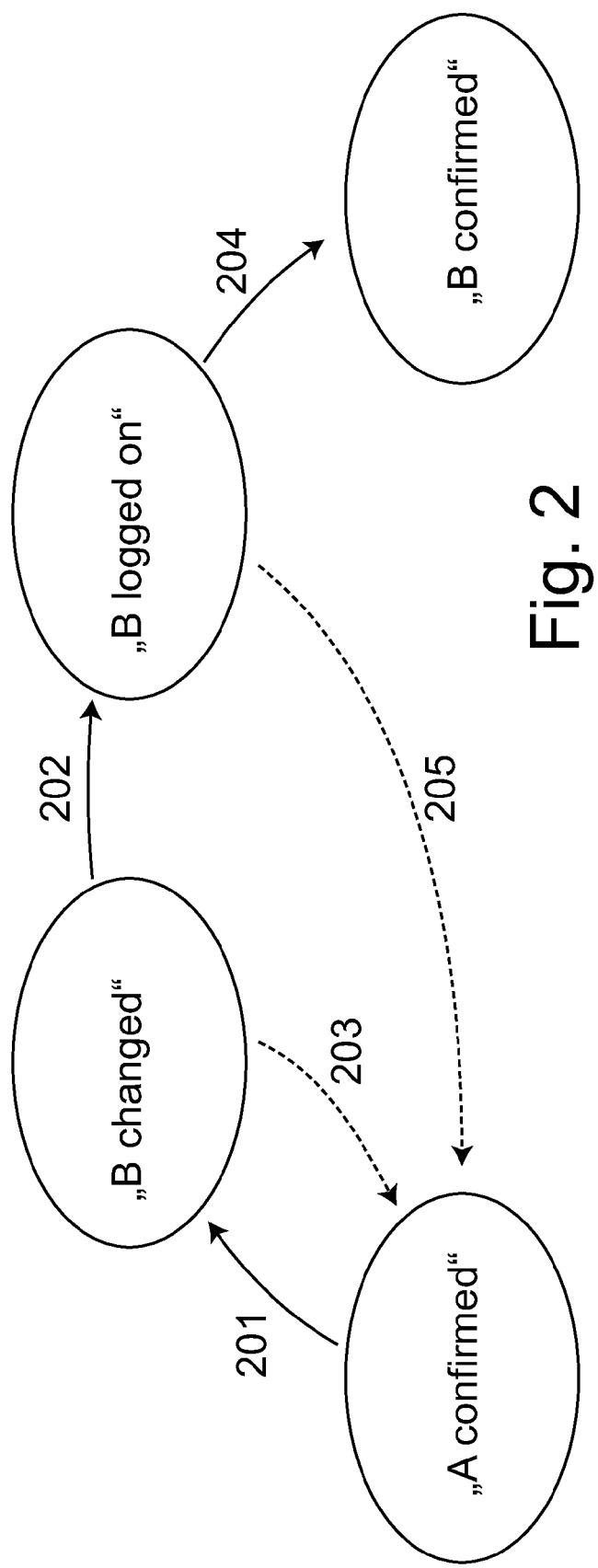

Below, the change from the active subscription data SA of service provider A to the active subscription data SB of service provider B will be explained with reference to the schematic state diagram for the identification module 104 shown in FIG. 2. In this context, the procedure for changing the active subscription data Si is described, for example, starting with a state in which the mobile radio device 101 is logged on to a mobile radio network using the subscription data SA of service provider A, and the activation of the subscription data SA cannot be automatically changed by the identification module 104 in a manner described below. This is the "A confirmed" state in FIG. 2. The mobile radio network 102*i* to which the mobile radio device 101 is logged on can be the mobile radio network 102A of service provider A, which is the home network of the identification module 104 when it is in the "A confirmed" state. However, the mobile radio device 101 can also be logged in to another mobile radio network by roaming using the subscription data SA of the service provider.

Users of the mobile radio device 101 can initiate a change of the service provider when they make such a change. In this case, the new service provider B, which initiates the change as described below, is informed to this effect and so is the old service provider A, which confirms the change before it is conclusively completed.

In order to initiate the change, service provider B sends an OTA message to the identification module 104, and this message contains a control command so as to command a change from the currently active subscription data SA to the subscription data SB. The message, which is sent via the mobile radio network 101*i* to which the mobile radio device 101 is currently connected, can also contain the subscription data SB of service provider B. In this case, the subscription data SB is installed after the message has been received in the identification module 104. Likewise, additional service provider-specific parameters XB of service provider B can already be contained in the message and, after the message has been received, these parameters XB are likewise stored in the identification module 104, and in this process, they can replace the previously installed parameters XA of service provider A. In another embodiment, the subscription data SB of service provider B can already have been stored ahead of time in the identification module 104 at the time when service provider B sends to the identification module 104 the message containing the command to change the active subscription data. For example, the subscription data SB (together with the subscription data SA of service provider A) can already be stored in the identification module 104 at the time of its production or initial configuration. This can also be provided for the parameters Xi.

After the message of service provider B has been received and after its successful authentication, the identification module 104 executes the command contained therein to change the active subscription data Si. For this purpose, the identification module 104 deactivates the previously active subscription data SA of service provider A and activates the subscription data SB of operator B that might have been previously installed. Then the identification module 104 is in the "B changed" state shown in FIG. 2, that is to say, the change corresponds to the state transition 201.

Moreover, in one embodiment, during the state transition 201, the additional service provider-specific parameters XA of service provider A are at least partially replaced by the service provider-specific data of service provider B which was contained in the OTA message that was sent to the identification module 104 by service provider B in order to initiate the change of the service provider. In particular, it can be provided that the information about networks is replaced so that, the next time the mobile radio device 101 logs on after the change, it logs on to a mobile radio network that is specified by the new service provider B. As an alternative, the parameters Xi are replaced at a later point in time by service provider B with its own parameters XB, for example, on the basis of an OTA message to this effect.

In conjunction with the activation of the subscription data SB, the identification module 104 causes the mobile radio device 101 to sign out of the mobile radio network 102*i* to which it is currently connected and to attempt to use the now active subscription data SB of the new service provider B to once again log on to a mobile radio network 102*i*. After the parameters Xi that are relevant for the network selection have been replaced, the mobile radio network 102B operated by service provider B, which is the new home network of the identification module 104, or—for example, if the mobile radio network 102B is not available—another mobile radio network selected on the basis of the service provider-specific information Xi can be selected for the log-on. Likewise, the log-on can also take place via the old home network 102A or via the mobile radio network 102*i* to which the mobile radio device 101 had been logged on before the change of the active subscription data Si. This may be the case if the service provider-specific information Xi for the network selection has not yet been replaced at the point in time of the log-on.

In order to log on, the identification module 104 is identified and authenticated on the basis of the new subscription data SB of service provider B by using the associated information stored for the identification module 104 in the subscriber database 105B of service provider B. This log-on procedure is initiated by a sign-on that is sent by the mobile radio device 101, and the successful log-on is reported to the mobile radio device 101 by service provider B or by the authentication center of service provider B that is performing the identification and the authentication.

In order to inform the identification module 104 about a successful log-on, it can be provided that the confirmation contained in the mobile radio device 101 is reported to the identification module 104. For this purpose, a report to this effect can be transferred from the terminal 106 of the mobile radio device 101 to the identification module 104, and the transmission of this message can be initiated by the terminal 106 or can be requested by the identification module 104. As an alternative, it can be provided that a message, a secure OTA message, is sent by service provider B to the identification module 104 in order to confirm the successful log-on. In this manner, the confirmation can even be transmitted to the identification module 104 if the terminal 106 of the mobile radio device 101 does not support the transmission of a confirmation message to the identification module 104. Another embodiment provides that the identification module 104 monitors internal parameters in which the current mobile radio network 102$i$ and/or the log-on status of the mobile radio device 101 are stored. In this case, a successful log-on with the new subscription data SB is determined on the basis of the value of such a parameter. An example of this is the parameter EFLOCI in which each current mobile radio network is stored.

On the basis of the activation of the subscription data SB of service provider B or on the basis of the sign-on used to log on to a mobile radio network using the subscription data SB of service provider B, a timer T1 is started in the identification module 104 in order to count down the period of time T1. If the identification module 104 receives the confirmation about the successful log-on of the mobile radio device 101 before the timer T1 has stopped, then the identification module 104 changes into a state that is designated in FIG. 2 as "B logged on", and the procedure to change the active subscription data is continued. After this state transition, which is illustrated as an arrow 202 in FIG. 2, the timer T1 can be deleted.

On the other hand, if the timer T1 stops before the identification module 104 has received the confirmation message about the successful log-on of the mobile radio network 101 using the subscription data SB, then the identification module 104 once again carries out a change of the active subscription data Si back to the subscription data SA of service provider A. In this process, the subscription data SB of service provider B is deactivated and the subscription data SA of service provider A is once again activated. After this change of the subscription data Si, the mobile radio device 101 once again uses the subscription data SA of service provider A to log on to a mobile radio network 101, and it is identified and authenticated by service provider A. In this manner, the identification module 104 returns to the "A confirmed" state, as is shown in FIG. 2 by the arrow 203.

Instead of using a timer, the period of time T1 can also be counted down in another manner, for example, by an event counter that receives periodically occurring events such as, for example, the receipt of periodical status reports of the terminal 106. Moreover, in addition or as an alternative to the countdown of the period of time, it can be provided that a change back to the subscription data SA of service provider A will be made if the confirmation of the successful log-on using the new subscription data has not been received by the time a prescribed event is detected. In this context, events can be, for instance, a change to another cell of the mobile radio network 102$i$ or a user input. However, it is possible to use any event that can be detected in the identification module 104.

If the parameters Xi used for the network selection have been replaced during the change to the subscription data SB of service provider B, this replacement can be reversed when the subscription data SA of service provider A is once again activated, by once again activating the parameters XA of service provider A, if this is possible (i.e. if this data has not already been deleted). In this manner, the parameters XA of service provider A are used for the network selection during the log-on, making use of the subscription data SA of service provider A. If the parameters XA of service provider A are no longer available, then the new parameters XB of service provider B are used for the log-on. These parameters—if the active subscription data is not once again changed after the return—can then be replaced, for example, by service provider A by an OTA message with its own parameters.

The return to the subscription data SA of service provider A that is provided in case of error prevents that the mobile radio device 101 can no longer log on to a mobile radio network after the active subscription data Si has been changed, as a result of which wireless communication with the identification module 104 is no longer possible. After the renewed log-on to a mobile radio network using the subscription data SA of the old service provider A, a change of the subscription data Si can be attempted once again. For this purpose, for example, corrected subscription data SB from service provider B can be transmitted to the identification module 104, or else corrections in the mobile radio network 102B of service provider B can be made in order to make it possible for the mobile radio device 101 to successfully log on after a renewed change of the active subscription data. Hence, after the deactivation of the subscription data SB of service provider B and after the return to the activation of the subscription data SA of service provider A, the subscription data SB of service provider B remains stored in the identification module 104. In alternative embodiments, however, it can likewise be provided that the subscription data SB is deleted.

After the successful log-on of the mobile radio device 101 to a mobile radio network using the subscription data SB of service provider B has been confirmed and the identification module 104 has changed to the "B changed" state, an authorization of the service provider change is carried out by the old service provider A. This service provider is not involved in the preceding steps of the changing procedure. Consequently, the provided explicit authorization of the change by service provider A prevents that a service provider change can be carried out without the permission of the old service provider A.

In order to carry out the authorization, after the successful log-on of the mobile radio device 101 to a mobile radio network using the subscription data SB of service provider B, a message is sent to the old service provider A. With this message, service provider A is informed about the change in the active subscription data Si. In one embodiment, the message is generated in the identification module 104, which also controls the transmission of the message from the mobile radio device 101 to service provider A. In an alternative embodiment, the old service provider A is informed by the new service provider B about the change in the active subscription data after service provider B has registered the successful log-on with the subscription data SB. After receiving the information about the change from the mobile radio device 101 or from the new service provider A and in order to authorize the service provider change, service provider A sends a confirmation message to the identification module 104 with which service provider A confirms the change. The message is an OTA message that is secured with the OTA key of service provider A and whose authenticity is checked in the identification module 104.

On the basis of the transmission of the message from the mobile radio device 101 to service provider A or on the basis of the confirmation about the successful log-on procedure using the subscription data SB, another timer T2 is started in the identification module 104 in order to count down the period of time T2. If the identification module 104 receives the confirmation message of service provider A before the timer T2 has stopped and if the authenticity of the message has been successfully checked, then the identification module 104 changes to a state in which the activation of the subscription data SB of service provider B is limited to cancellation by a renewed initiation of a service provider change on the part of the service provider, but no longer autonomously by the identification module 104. This state is designated in the state diagram of FIG. 2 as "B confirmed," and the transition into this state is indicated by the arrow 204.

If, on the other hand, the confirmation message is not received from the old service provider A before the timer T2 has stopped and/or if it does not successfully authenticate the identification module 104, then the identification module 104 automatically carries out a change of the subscription data Si back to the active subscription data SA of service provider A, and logs on to a mobile radio network using this subscription data SA. In this manner, the identification module 104 automatically returns to the subscription data SA of service provider A if said service provider does not authorize the service provider change. Consequently, a service provider change cannot be made without the permission of service provider A. Due to the return to the subscription data of service provider A, the transition is made back to the "A confirmed" state as shown in FIG. 2 by the arrow 205. The return is carried out in the same manner as the state transition 203 in the case of an error in the log-on using the subscription data SB. Therefore, for the sake of avoiding repetitions, an exhaustive description of the return procedure will be dispensed with and reference is hereby made to the preceding explanations.

Instead of the timer T2, as already described in conjunction with the timer T1, it is also possible to use, for example, an event counter to count down the period of time T2. Moreover, as an alternative or in addition to the countdown of the period of time, it can also be provided that a return is made to the subscription data SA of service provider A if a certain event is detected without the confirmation message of service provider SA having been received in the identification module 104.

After the identification module 104 has made the transition to the "B confirmed" state, a message is sent to the old service provider A with which service provider A is informed about the successful completion of the service provider change. The message can be generated in the identification module 104 after the identification module 104 has received and successfully authenticated the confirmation message of service provider A before the timer T2 has stopped, and the message can be sent to service provider A by the mobile radio device 101, in a manner controlled by the identification module 104. After the message has been received, service provider A can delete the registration of the identification module 104 as well as the associated data from its subscriber database 105A. The deleting procedure is not carried out before the message has been received, since, before receiving the message, service provider A cannot assume that the confirmation message that it previously sent has been received and successfully authenticated in the identification module 104 nor can it assume that the identification module 104 has changed to the "B confirmed" state in which an automatic return to the subscription data SA of service provider A is no longer provided for. In particular, it is advantageous not to delete the data of the identification module 104 of service provider A already after sending the confirmation message—even if the confirmation message is sent after the successful log-on with the new subscription data SB. The reason for this is that the confirmation message might not be received in the identification module 104 as a result of a transmission error, which would lead to a return to the old subscription data A of service provider A.

An alternative embodiment differs from the above-mentioned embodiment in that, if the service provider change has not been confirmed by the old service provider, then the identification module 104 does not return from the activation of the subscription data SB of service provider B to the activation of subscription data SA of service provider A, but rather, without the confirmation of the change from the old service provider, no activation of the subscription data SB of the new service provider B can be carried out.

In this embodiment, the old service provider A is already informed about the change after receiving the OTA message of service provider B initiating the service provider change. As described above, this can be done in the form of a notification that is sent from the identification module 104 to the old service provider A, or else the old service provider can be informed about the change by the new service provider B. On the basis of the report that a service provider change is to be carried out in the identification module 104, service provider A—if it is in agreement—sends an OTA message to the identification module 104 confirming the change, which is then authenticated in the identification module 104. After this OTA message has been received and successfully authenticated, the identification module 104 activates the subscription data SB of the new service provider B and deactivates the subscription data SA of the old service provider A. As long as the message has not yet been received, the identification module 104, however, blocks the activation of the subscription data SB of service provider B. Likewise, the activation of the subscription data SB of service provider B is blocked by the identification module 104 if an OTA message of the old service provider A is received in the identification module 104, but if this message cannot be successfully authenticated, or if an OTA message of service provider A is received in the authentication module prohibiting the service provider change.

After the activation of the subscription data SB of service provider B, in the manner described above, an attempt is made to log the mobile radio device 101 on to a mobile radio network using this subscription data SB. If this is successful, then the service provider change is completed, and the identification module 104 is in the "B confirmed" state. This is reported to the old service provider A in the manner described above, and this service provider can then delete the registration of the identification module 104 on the basis of having received the report to this effect. If the mobile radio device 101 cannot be successfully logged on to a mobile radio network 102 using the subscription data SB of service provider B, then the identification module, as described above, returns to the activation of the subscription data SA of the old service provider A and thus to the "A confirmed" state, and subsequently, for example, a renewed attempt can be made to change the service provider.

In the manner described above, a change from the subscription data SA of a first service provider A to the subscription data SB of a second service provider B can be made securely and reliably. In a similar manner, during the life cycle of the identification module 104, additional subscription data changes can be made. For example, a change can be made one or more times to the subscription data Si of another service provider and/or to the subscription data Si of a service provider if that data had already been activated, and vice versa.

Although the subject innovation has been described in detail in the drawings and in the presentation given above, the presentations are merely illustrative and provided by way of example, and should not be construed in a limiting manner. In particular, the subject innovation is not limited to the explained embodiments. The person skilled in the art can glean additional variants of the subject innovation and their execution from the preceding disclosure, from the figures and from the patent claims.

In the patent claims, terms such as "include", "comprise", "contain", "have" and the like do not exclude additional elements or steps. The use of the indefinite article does not preclude the plural. Each individual device can execute the functions of several of the units or devices cited in the patent claims. The reference numerals indicated in the patent claims are not to be construed as a limitation of the subject innovation.

What is claimed is:

1. A method for changing from active subscription data of a first service provider to active subscription data of a second service provider in an identification module when inserted in a mobile radio device that can be connected to a mobile radio network, wherein change is initiated in the identification module in response to a receipt of a first message from the second service provider by means of the identification module, and wherein, after initiation of the change, the identification module controls activation of the subscription data of the second service provider based on a receipt of a message from the first service provider by means of the identification module confirming the change, and wherein, after the activation of the subscription data of the second service provider, the identification module automatically returns to activation of the subscription data of the first service provider if the message from the first service provider confirming the change is not received in the identification module.

2. The method according to claim 1, wherein the message from the first service provider confirming the change is sent when the first service provider has received a report providing information about the change.

3. The method according to claim 2, wherein the report providing information about the change is sent to the first service provider by the identification module.

4. The method according to claim 3, wherein the identification module blocks the activation of the subscription data of the second service provider until the message from the first service provider confirming the change has been received in the identification module.

5. The method according to claim 1, wherein returning to the activation of the subscription data of the first service provider is carried out after the mobile radio device has logged on to a mobile radio network by using the subscription data of the second service provider.

6. The method according to claim 5, wherein the report providing information about the change is sent by the identification module to the first service provider after the log-on to the mobile radio network carried out using the subscription data of the second service provider.

7. The method according to claim 1, wherein return to the use of the subscription data of the first service provider takes place when the message from the first service provider confirming the change is not received within a certain period of time and/or until a predefined event is detected.

8. The method according to claim 7, wherein a countdown of the certain period of time is started in response to logging-on to the mobile radio network, or transmission of the report informing the first service provider about the change.

9. The method according to claim 8, wherein the subscription data of the second service provider is transmitted to the identification module within a message of the second service provider and, after the message is received, the subscription data is installed in the identification module.

10. The method according to claim 9, wherein messages of a service provider comprise an authentication feature of the service provider, which is checked in the identification module.

11. The method according to claim 10, wherein the identification module uses a cryptographic key in order to check the authentication feature associated with a service provider, the key being selected from a plurality of secret keys that are stored in the identification module and that are associated with various service providers.

12. An identification module for use in a mobile radio device that can be connected to a mobile radio network, wherein the identification module is configured to change from an active subscription data of a first service provider to an active subscription data of a second service provider when inserted in the mobile radio device, wherein the change can be carried out in the identification module in response to the receipt of a first message from the second service provider by means of the identification module, and wherein the identification module is configured to control activation of the subscription data of the second service provider after initiating the change based on a message from the first service provider by means of the identification module confirming the change, and wherein, after the activation of the subscription data of the second service provider, the identification module automatically returns to the activation of the subscription data of the first service provider if the message from the first service provider confirming the change is not received in the identification module.

* * * * *